United States Patent [19]

Yokota

[11] Patent Number: 5,178,805
[45] Date of Patent: Jan. 12, 1993

[54] METHOD OF CONTROLLING INJECTION SPEED SELECTING POINTS OF INJECTION MOLDER

[75] Inventor: Akira Yokota, Hirakata, Japan

[73] Assignee: Komatsu Ltd., Tokyo, Japan

[21] Appl. No.: 776,353

[22] PCT Filed: Mar. 13, 1991

[86] PCT No.: PCT/JP91/00338
§ 371 Date: Nov. 13, 1991
§ 102(e) Date: Nov. 13, 1991

[87] PCT Pub. No.: WO91/13746
PCT Pub. Date: Sep. 19, 1991

[51] Int. Cl.$^5$ .................. B29C 45/50; B29C 45/77
[52] U.S. Cl. .................. 264/40.1; 264/40.4; 264/40.5; 425/140; 425/148
[58] Field of Search .................. 264/40.1, 40.4, 40.5, 264/328.1; 425/135, 140, 145, 146, 147, 148, 149

[56] References Cited

U.S. PATENT DOCUMENTS

| | | | |
|---|---|---|---|
| 4,326,255 | 4/1982 | Fujita | 264/40.1 |
| 4,753,588 | 6/1988 | Kiya | 425/145 |
| 4,832,883 | 5/1989 | Kato et al. | 264/40.1 |
| 4,846,651 | 7/1989 | Matsuda et al. | 425/145 |
| 4,849,143 | 7/1989 | Langecker | 264/40.1 |

FOREIGN PATENT DOCUMENTS 61-182913 8/1986 Japan.

*Primary Examiner*—Jill L. Heitbrink
*Attorney, Agent, or Firm*—Armstrong, Teasdale, Schlafly & Davis

[57] ABSTRACT

The invention relates to a method of controlling the injection speed selecting points of an injection molder, or more specifically to a method of controlling the injection speed selecting points of an injection molder injecting plasticized synthetic resin from the cylinder into a mold cavity at speed varied in multiple steps in each injection process. The objective is to control the injection molder so as to mold a product with constant surface quality in each injection process for continuous molding production. For this purpose, appropriate injection speed selecting points are determined for each injection process so as to ensure that a constant weight of plasticized synthetic resin is injected at each selected speed, and the injection speed selecting points of the injection molder is controlled accordingly.

6 Claims, 4 Drawing Sheets

METHOD OF CONTROLLING INJECTION SPEED SELECTING POINTS OF INJECTION MOLDER

FIELD OF THE INVENTION

The present invention relates to an injection speed selecting point controlling method for an injection molder, or more specifically to a method of controlling the positions of selecting the speed of injecting plasticized synthetic resin from the injection molder cylinder into a mold cavity, for each injection process in which the injection speed is varied in multiple stages.

BACKGROUND OF THE INVENTION

The speed of injecting plasticized synthetic resin into a mold cavity influences the resin flow rate in the cavity. The resin flow rate or flow state determines the surface quality of a molded product. In addition, the flow rate of plasticized synthetic resin in a mold cavity must be suitable to the inside shape of the cavity or an intended molding shape, the resin property, and the molding production efficiency. Therefore, it is necessary to change the resin injection speed in multiple stages in each injection process, so as to obtain a resin flow suitable to the various conditions in the mold cavity. Simultaneously, in order to maintain a constant quality of molded products, it is necessary to control the injection speed at a high accuracy so that the specified amount of plasticized synthetic resin is injected at each selected speed into the cavity in each injection process.

In controlling the resin injection speed varied in multiple stages so as to obtain moldings with a stable quality, it is essential that the injection speed and the amount of resin injected at each selected speed in each injection process have reproducibility. Various methods have been proposed for such control of the injection process. Among them is an art disclosed in the Japanese Patent Publication No. 59060 of Showa 57 (1982).

The injection speed of plasticized synthetic resin, which influences the flow rate of the resin in a mold cavity, is determined by the configurations of the resin flow passages in the mold cavity and injection molder nozzle, the viscosity of the resin, and the pushing pressure applied to the screw. The configurations of the resin flow passages in the mold cavity and injection molder nozzle are fixed. The resin viscosity can be stabilized easily by maintaining a constant resin temperature. The pushing pressure to be applied to the screw can also be controlled easily by means of various controlling devices. Therefore, it is easy to reproduce the injection speed for each stage in each injection process.

According to the conventional injection process control method in which injection speed is varied in multiple stages during each injection process, a constant amount of plasticized synthetic resin is injected at each selected speed into a mold cavity by controlling the injection speed selecting point according to the travel distance of the screw.

In injection molding operation, measuring process is always conducted prior to the plasticized synthetic resin injection into a mold. In this measuring process, a specified amount of plasticized synthetic resin is supplied into the heated cylinder and melted. The screw position at the end of this measuring process is the start point for the screw to travel, that is, the injection start point. Therefore, when the screw position at the end of the measuring process has changed or has been changed, and when the screw is moved over a specified distance to an injection speed selecting point at which the injection speed is changed, it is only possible to control the volume of plasticized synthetic resin injected by the screw moving from the travel start point or injection start point to the injection speed selecting point, but not possible to maintain a constant filling weight, as long as the plasticized synthetic resin in front of the screw is compressible. Not only when the screw position at the end of the measuring process in the initial stage of molding operation has been changed as mentioned above, but also when the pressure applied to the screw immediately before injection and/or the injection speed have been changed, it is not possible to obtain injection speed selecting points which ensure the same filling weight as that before the injecting condition is changed, unless the screw stroke between the injection start point and each injection speed selecting point is changed. Thus, by the conventional injection process control method which determines injection speed selecting points according to the screw traveling distance, it is not possible to detect the injection speed selecting points which ensure a constant filling weight of plasticized synthetic resin by each injection process. Consequently, constantly high quality moldings cannot be produced.

In view of the above problem of the conventional art, the object of the present invention is to provide a method of controlling the injection speed selecting points of an injection molder whose injection speed of plasticized synthetic resin is varied in multiple stages in each injection process, so that the resin is injected by a constant weight from the injection molder cylinder into the cavity of a mold in each stage of each injection process.

DISCLOSURE OF THE INVENTION

According to the present invention, to achieve the above object, a method of controlling the injection speed selecting points for plasticized synthetic resin to be injected from the cylinder of an injection molder into the cavity of a mold at speed varied in multiple stages in each injection process, comprises the steps of:

(a) preliminarily obtaining the formula for relation among the resin pressure value, specific volume value and temperature of the plasticized synthetic resin, as a characteristic equation for the plasticized synthetic resin;

(b) detecting the resin pressure and screw positional values immediately before injection under a reference injecting condition, and the resin pressure value with the screw at each injection speed selecting point;

(c) detecting the resin pressure and screw positional values immediately before injection under a changed injecting condition;

(d) determining the injection speed selecting points for the changed injecting condition, through operations on the basis of the obtained formula for relation among the resin pressure value, specific volume value and temperature of the plasticized synthetic resin as well as the detected resin pressure and screw positional values immediately before injection under the reference injecting condition and the detected resin pressure and screw positional values immediately before injection under the changed injecting condition; and (e) changing the injection speed when the screw has been moved from the position immediately before injection to each determined injection speed selecting point for the changed injecting condition.

Instead of the resin pressure value with the screw at each injection speed selecting point for the reference injecting condition, the weight of plasticized synthetic resin injected to fill in the cavity of the mold by the screw moving from the position immediately before injection to each injection speed selecting point for the reference injecting condition may be obtained and used to control the injection speed selecting points of the injection molder.

The changed injecting condition refers to the condition in which the resin pressure value and/or screw positional value immediately before injection are changed from those for the reference injecting condition. The resin pressure value can be obtained by detecting the pushing pressure value applied to the screw to effect the resin pressure value.

Since plasticized synthetic resin is generally compressible, the resin volume for a certain resin weight varies depending on the resin temperature and pressure. In injection molding of plasticized synthetic resin, therefore, it is difficult to obtain products with a constant quality if resin volume is used to set the molding condition and to monitor the molding process. To produce moldings with a constant quality, it is necessary to obtain a formula for relation among the resin pressure value (P), specific volume value (V) and temperature (T) of the plasticized synthetic resin (hereinafter referred to as the PVT relation formula) as a characteristic equation of the resin, and to set the molding condition and monitor the molding process on the basis of this formula.

Generally, the weight G of plasticized synthetic resin injected from the cylinder by the screw moving from the point $S_I$ to the point $S_H$ as shown in FIG. 1 is expressed by the equation (1) using the specific volume values of the resin obtained from the PVT relation formula. Since the injection weight G of the resin from the cylinder is equal to the filling weight G' of the resin in the mold cavity, the term "filling weight G" is used in place of the injection weight G in the following description.

$$\frac{G}{A} = \frac{S_I}{V(P_{RI}, T_I)} - \frac{S_H}{V(P_{RH}, T_H)} \quad (1)$$

in which

A: inside cross sectional area of cylinder
$P_{RI}$: resin pressure value for $S_I$
$P_{RH}$: resin pressure value for $S_H$
$T_I$: resin temperature for $S_I$
$T_H$: resin temperature for $S_H$
$V(P_{RI}, T_I)$: specific volume value of resin for $P_{RI}$ and $T_I$
$V(P_{RH}, T_H)$: specific volume value of resin for $P_{RH}$ and $T_H$ According to the present invention, the amount of plasticized synthetic resin filled in a mold cavity is calculated as the filling weight by using the above equation (1), manipulating the filling amount as a specific volume value of the resin on the basis of the PVT formula. Specifically, various necessary data on the screw positional values and resin pressure values for the reference injecting condition are obtained, and the resin pressure value and screw positional value immediately before injection under a changed injecting condition are obtained. Then, computing operation is performed on the basis of these values to obtain appropriate injection speed selecting points which allow injection of a constant weight of resin into the mold cavity in each stage of each injection process under the changed injecting condition. The injection speed selecting points of the injection molder is controlled so that the injection speed is changed at the calculated points for the changed injecting condition.

BRIEF DESCRIPTION OF THE DRAWINGS

FIGS. 1 through 8 explain a preferred embodiment of the present invention of a method of controlling the injection speed selecting points of an injection molder:

FIG. 1 is an explanatory drawing showing the positional values of the screw,

FIG. 2 is a schematic vertical section of an entire injection molder including a mold, FIG. 3 is another explanatory drawing showing the positional values of the screw, FIG. 4 is a graph explaining the method of converting the capacity of the cylinder space between the front end of the screw at the forward limit to the flow path starting point, FIG. 6 is a graph showing the relation between specific volume value and temperature of resin under a constant pressure, FIG. 7 is a schematic vertical section of an entire injection molder including a mold for reference in obtaining the PVT relation formula, and FIG. 8 is a drawing for explaining the method of obtaining the PVT relation formula.

PREFERRED EMBODIMENT OF THE INVENTION

An embodiment of the present invention of a method of controlling the injection speed selecting points of an injection molder is described below with reference to the accompanying drawings.

Figure 1:
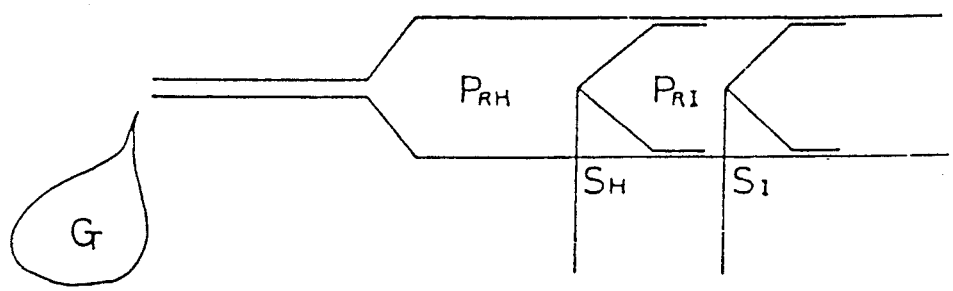
Figure 2:
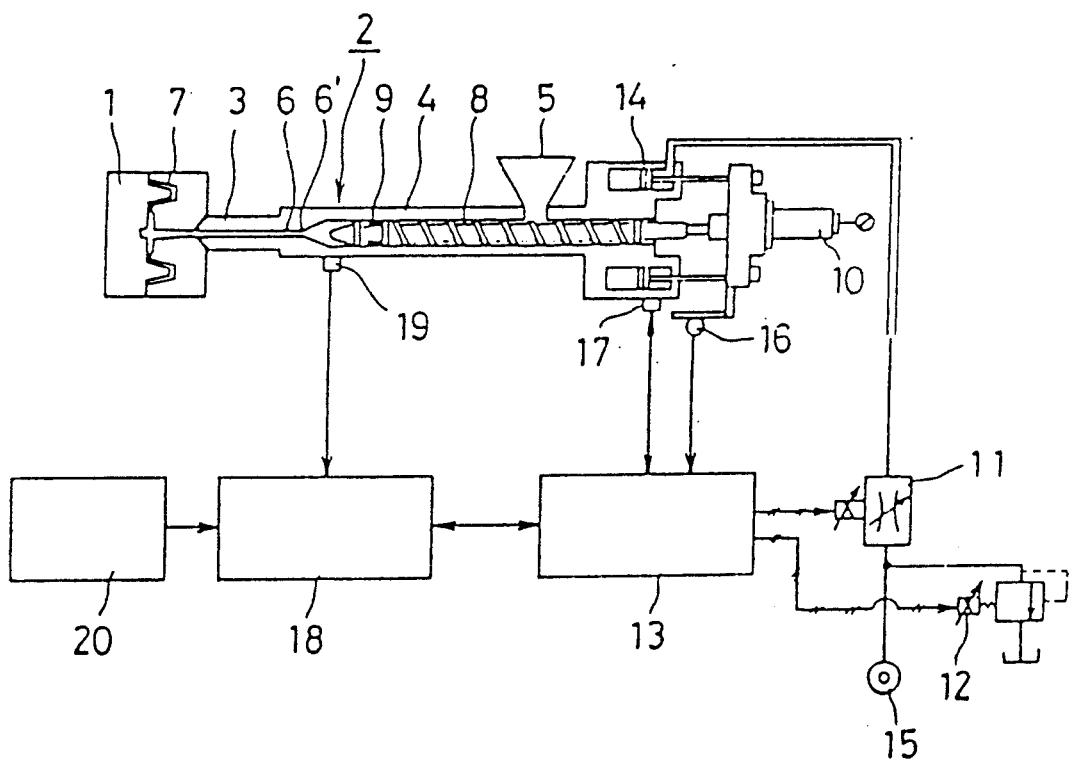

Referring to FIG. 2, an injection molder 2 is connected through a nozzle 3 with a mold 1 in which a product is to be injection-molded. The injection molder 2 has a cylinder 4 containing a screw 8. Resin pellets supplied through a hopper 5 are melted and kneaded by the screw 8 in the heated cylinder 4 while the molten resin is forced out by the screw 8 into the cavity 7 of the mold 1 through a flow path 6 formed in the nozzle 3. A check valve 9 is provided at the front end of the screw 8. The screw 8 is rotated by a screw-driving motor 10, for melting and kneading the resin pellets. Since the cross sectional area of the flow path 6 in the nozzle 3 is far smaller than the inside cross sectional area of the cylinder 4, plasticized synthetic resin with a very high viscosity and Bingham plasticity is faced with a very high flow resistance at a flow path inlet 6'. An injection piston 14 applies specified pressures to the screw 8 and drives it for reciprocating motion with respect to the nozzle 3, whereby the resin is injected into the cavity 7 of the mold 1. The injection piston 14 is operated by means of oil pressure controlled by an electromagnetic flow valve 11 and an electromagnetic pressure valve 12 both of which are operated by a controller 13. 15 is a pressure oil source. The controller 13 receives the positional data of the screw 8 in the cylinder 4 which are output from a screw position detector 16, as well as the pushing pressure data for the screw 8 which are output from a screw pushing pressure detector 17. The controller 13 gives these data to a processor 18.

In addition to these data, temperature data of the plasticized synthetic resin in the cylinder 4 is given from a resin temperature detector 19 to the processor 18, and external data such as the filling weight of plasticized synthetic resin is given from an external input device 20 to the processor 18. On the basis of these data as well as the positional data and pushing pressure data of the screw 8 given from the controller 13, the processor 18 performs operations for the PVT relation formula and the injection speed selecting points.

On the basis of the positional data of the screw 8 given from the screw position detector 16, the controller 13 controls the operation of the electromagnetic flow valve 11 and electromagnetic pressure valve 12 according to a specified program, so as to apply specified pressure to the screw 8 and to drive the screw 8 for reciprocating motion with respect to the nozzle 3.

In the present embodiment, the PVT relation formula is used to control the injection speed selecting points of the injection molder in injecting plasticized synthetic resin into the cavity 7 of the mold 1 at multiple-step variable speed. If the PVT relation formula is known, it is possible to control the injection speed selecting points for an injecting condition different from the reference injecting condition, in the method described below. Where the PVT relation formula is not known, the injection speed selecting points can be obtained by the method described later.

Figure 3:
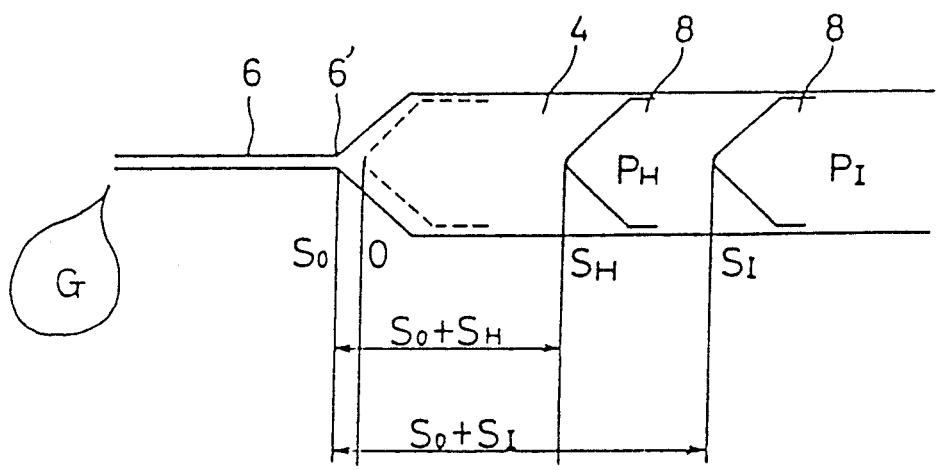

As indicated in FIG. 3, the filling weight G of plasticized synthetic resin injected by the screw 8 moving from the point $S_I$ to the point $S_H$ is generally expressed by the above-mentioned equation (1) using the specific volume values of resin obtained from the PVT relation formula. In the present embodiment, instead of resin pressure values, the pushing pressure value applied to the screw to attain each resin pressure value is used in obtaining the specific volume values of the resin. Therefore, the equation (1) may be replaced by the equation (1)':

$$\frac{G}{A} = \frac{S_I}{V(P_I,T_I)} - \frac{S_H}{V(P_H,T_H)} \qquad (1)'$$

in which

A: inside cross sectional area of cylinder
$P_I$: screw pushing pressure value for $S_I$
$P_H$: screw pushing pressure value for $S_H$
$T_I$: resin temperature for $S_I$
$T_H$: resin temperature for $S_H$
$V(P_I,T_I)$: specific volume value of resin for $P_I$ and $T_I$
$V(P_H,T_H)$: specific volume value of resin for $P_H$ and $T_H$ As shown in FIG. 3, the positional values of $S_I$ and $S_H$ are both determined with the forward limit position of the screw 8 (at the screw positional value of "0") as a reference point. However, the screw 8 compresses, under each applied pressure, the plasticized synthetic resin in the space between the front end of the screw 8 and the flow path inlet 6'. Therefore, in order to obtain accurate filling weight G, the equation (1)' must take account of the capacity of the cylinder 4 between the front end of the screw 8 at its forward limit position and the flow path inlet 6'. Specifically, when the capacity of the cylinder 4 from the front end of the screw 8 at its forward limit position to the flow path inlet 6' is converted to a screw positional value which is assumed to be $S_o$, the filling weight G is expressed by the following equation (2) using the screw pushing pressure values corresponding to the resin pressure values:

$$\frac{G}{A} = \frac{S_O + S_I}{V(P_I,T_I)} - \frac{S_O + S_H}{V(P_H,T_H)} \qquad (2)$$

Figure 4:
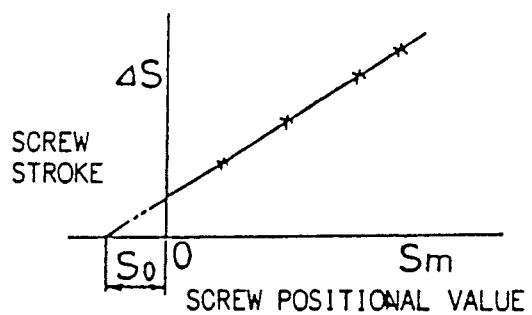

The value of $S_o$ can be obtained easily from the design values of the injection molder. If the design values are unknown, the value of $S_o$ is experimentally obtained in the following procedure:

When a specified pressure is applied to the screw with resin temperature maintained constant, the screw is moved forward to compress the plasticized synthetic resin in the cylinder. The screw stroke ΔS in this forward movement is proportional to the resin volume or the positional value $S_m$ of the screw in the cylinder before application of the specified pressure. Therefore, if a linear function for ΔS and $S_m$ is obtained by varying the resin volume $S_m$ to be compressed, the value of $S_o$ can be determined through extrapolation of a value of $S_m$ for ΔS=0, as shown in FIG. 4.

Figure 5A:
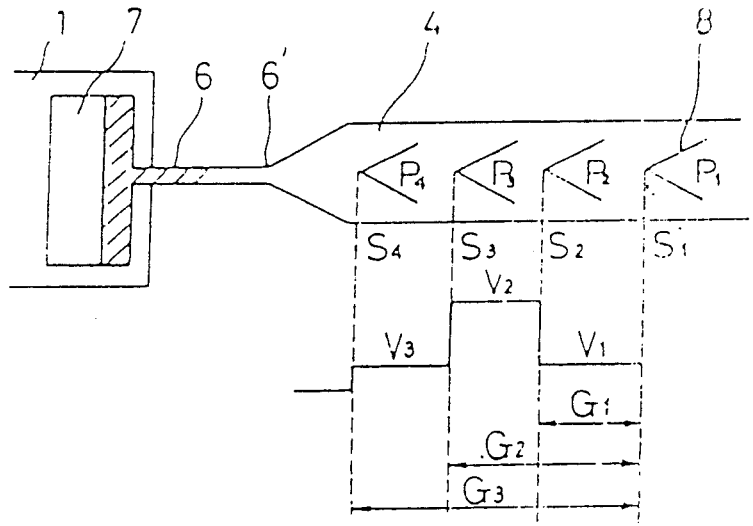
FIG. 5(a) is an explanatory drawing showing a reference injecting condition.

The reference injecting condition for the present embodiment is shown in FIG. 5(a). From the screw position immediately before injection or the injection start point (with screw positional value of $S_1$), the screw 8 is moved forward to inject plasticized synthetic resin at the first step injection speed $V_1$ into the cavity 7 of the mold 1. When the screw 8 reaches the first injection speed selecting point (with screw positional value of $S_2$), the second step injection speed $V_2$ is selected for resin injection. When the screw 8 is moved forward and reaches the second injection speed selecting point (with screw positional value of $S_3$), the third step injection speed $V_3$ is selected. One injection process is completed when the screw 8 has reached the injection end point (with screw positional value of $S_4$). Each of the above injection speeds $V_1$, $V_2$ and $V_3$ is obtained by changing the pressure applied to the screw.

Figure 5B:
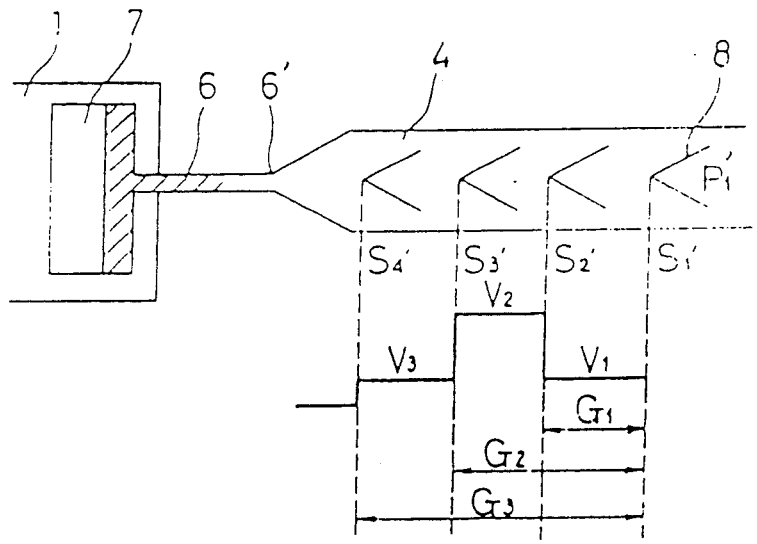
FIG. 5(b) is an explanatory drawing showing a changed injecting condition.

A changed injecting condition for the present invention is shown in FIG. 5(b), which presents the injection start point (with screw positional value of $S_1'$), the first injection speed selecting point (with screw positional value of $S_2'$), the second injection speed selecting point (with screw positional value of $S_3'$) and the injection end point (with screw positional value of $S_4'$) as well as the pressure $P_1'$ applied to the screw at the injection start point.

There are two methods of controlling the injection speed selecting points for the injecting condition changed from the reference injecting condition. One method is based on the pushing pressure value applied to the screw at each injection speed selecting point for the reference injecting condition, as described below as Embodiment 1. The other is based on the weight of plasticized synthetic resin injected into the cavity 7 of the mold 1 by the screw 8 moving from the injection start point to each injection speed selecting point for the reference injecting condition, as described below as Embodiment 2.

The two Embodiments are described with reference to FIGS. 2 and 5.

EMBODIMENT 1

For controlling the injection speed selecting points, the reference injecting condition is first determined in the following procedure:

The screw 8 is moved back, and a specified amount of plasticized synthetic resin is measured. A specified pushing pressure is applied by the injection piston 14 to the screw 8, and the screw position immediately before injection or the screw position at the injection start point is detected as positional value $S_1$ by the screw position detector 16. Simultaneously when the screw positional value $S_1$ is detected, the controller 13 outputs a screw pushing pressure detection signal to the screw pushing pressure detector 17, which accordingly detects the screw pushing pressure $P_1$. The detected values $S_1$ and $P_1$ are sent through the controller 13 to the processor 18. Resin temperature $T_1$ is also detected by the resin temperature detector 19 when the screw is at the injection start point. The detected resin temperature value $T_1$ is given to the processor 18.

In succession, the screw 8 is moved forward from the position immediately before injection, that is, from the injection start point, to inject resin at the first step injection speed $V_1$. When the screw 8 reaches the specified first injection speed selecting point, or in other words when the screw position detector 16 detects the screw positional value $S_2$, the controller 13 outputs a screw pushing pressure detection signal to the screw pushing pressure detector 17, which accordingly detects the screw pushing pressure value $P_2$. At the first injection speed selecting point (with screw positional value of $S_2$), the injection speed is changed to the second step injection speed $V_2$ while injecting operation is continued. When the screw 8 reaches the specified second injection speed selecting point, or in other words when the screw position detector 16 detects the screw positional value $S_3$, the controller 13 outputs the screw pushing pressure detection signal to the screw pushing pressure detector 17, for detection of the screw pushing pressure value $P_3$. At this second injection speed selecting point (with screw positional value of $S_3$), the injection speed is changed to the third step injection speed $V_3$, and injecting operation is continued. Finally, when the screw 8 reaches the specified injection end point, or in other words when the screw positional value $S_4$ is detected by the screw position detector 16, the controller 13 outputs the screw pushing pressure detection signal to the screw pushing pressure detector 17 for detection of the screw pushing pressure value of $P_4$. One injection process is thus completed. The detected screw positional values $S_1$ through $S_4$ and the detected screw pushing pressure values $P_1$ through $P_4$ are sent through the controller 13 to the processor 18.

Since the fluctuation in the resin temperature during one injection process is negligibly small, the resin temperature $T_1$ detected with the screw in the position immediately before injection or namely at the injection start point with the positional value of $S_1$ is used for all the screw positional values $S_2$, $S_3$ and $S_4$.

The weight of plasticized synthetic resin injected while the screw is moved from the injection start point to the first injection speed selecting point is referred to as the first filling weight $G_1$, the one injected while the screw is moved from the injection start point to the second injection speed selecting point is referred to as the second filling weight $G_2$, and the one injected while the screw is moved from the injection start point to the injection end point is referred to as the third filling weight $G_3$. The reference injecting condition is thus determined.

If the positional value of the screw in the position immediately before injection or at the injection start point and/or the screw pushing pressure value applied to the screw at this position are changed from those of the reference injecting condition, the injection speed selecting points must be adjusted so that products molded under the changed condition have the same surface quality as the products obtained under the reference injecting condition. The screw positional value at each injection speed selecting point adjusted for the changed injecting condition is obtained in the following method.

When the screw positional value $S_1$ for the position immediately before injection or the injection start point for the reference injecting condition is changed to $S_1'$, it is necessary to determine the screw positional values $S_2'$, $S_3'$ and $S_4$ for the first and second injection speed selecting points and the injection end point for the changed injecting condition.

The screw 8 is moved back, and a specified amount of plasticized synthetic resin is measured. A specified pushing pressure is applied by the injection piston 14 to the screw, and the screw position immediately before injection or the screw position at the injection start point is detected as positional value $S_1'$ by the screw position detector 16. Simultaneously when the screw positional value $S_1'$ is detected, the controller 13 outputs a screw pushing pressure detection signal to the screw pushing pressure detector 17, which accordingly detects screw pushing pressure value $P_1'$. The detected values $S_1'$ and $P_1'$ are sent through the controller 13 to the processor 18. Resin temperature $T_1'$ is also detected by the resin temperature detector 19 when the screw is at the injection start point. The detected resin temperature value $T_1'$ is given to the processor 18.

The processor 18 calculates the screw positional value $S_2'$ at the first injection speed selecting point for the changed injecting condition in the following procedure, using the PVT relation formula, the data for the reference injecting condition, and various data with the screw in the position immediately before injection or at the injection start point for the changed injecting condition:

The first filling weight $G_1$ is constant if the screw positional value at the injection start point and/or the resin pressure value for this screw position are changed. Therefore, when the pushing pressure value applied to the screw at the first injection speed selecting point $S_2'$ is assumed to be $P_2'$, the first filling weight $G_1$ is expressed by the following equation (3) on the basis of the equation (2):

$$\frac{G_1}{A} = \frac{S_0 + S_1}{V(P_1,T_1)} - \frac{S_0 + S_2}{V(P_2,T_1)} \qquad (3)$$

$$= \frac{S_0 + S_1'}{V(P_1',T_1')} - \frac{S_0 + S_2'}{V(P_2',T_1')}$$

Here, if the screw position is changed, the pushing pressure value applied to the screw is the same as long as the filling weight of plasticized synthetic resin in the cavity 7 of the mold 1 and the injection speed are constant. Therefore, the screw pushing pressure value $P_2'$ at the first injection speed selecting point $S_2'$ for the changed injecting condition may be considered to be equal to the screw pushing pressure value $P_2$ for the reference injecting condition, on the following ground: The resistance of the plasticized synthetic resin in the cavity 7 of the mold 1 or the flow path 6 of the nozzle 3 is determined by the configuration of the cavity 7 or the flow path 6 as well as by the viscosity and flow rate of the plasticized synthetic resin. According to the present invention, the cavity 7 and the flow path 6 have fixed configurations. Besides, the plasticized synthetic resin provides a constant viscosity if the resin temperature is fixed, and the resin flow rate is constant if resin injection speed is constant. Meanwhile, since the difference between the resin temperature $T_1$ for the reference injecting condition and the resin temperature $T_1'$ for the changed injecting condition is negligibly small, $T_1'$ may be considered to be equal to $T_1$. Therefore, the equation (3) may be replaced by the equation (4), which is transformed to the equation (4)' from which the screw positional value $S_2'$ at the first injection speed selecting point for the changed injecting condition is obtained.

$$\frac{G_1}{A} = \frac{S_0 + S_1}{V(P_1,T_1)} - \frac{S_0 + S_2}{V(P_2,T_1)} \qquad (4)$$
$$= \frac{S_0 + S_1'}{V(P_1',T_1)} - \frac{S_0 + S_2'}{V(P_2,T_1)}$$

$$S_2' = -V(P_2,T_1)\frac{S_0 + S_1}{V(P_1,T_1)} + \qquad (4)'$$
$$V(P_2,T_1)\frac{S_0 + S_1'}{V(P_1',T_1)} + S_2$$

The screw positional values $S_3'$ and $S_4'$ at the second injection speed selecting point and injection end point for the changed injecting condition are also obtained through the same operation as the above. The screw positional values $S_2'$, $S_3'$ and $S_4'$ at the first and second injection speed selecting points and the injection end point for the changed injecting condition, thus calculated by the processor 18, are given to the controller 13.

On the basis of the screw positional values $S_2'$ through $S_4'$ for the changed injecting condition, the controller 13 controls the movement of the screw 8 via the electromagnetic flow valve 11 and electromagnetic pressure valve 12 according to a specified program. Consequently, plasticized synthetic resin is injected by the specified filling weights of $G_1$, $G_2$ and $G_3$ into the cavity 7 of the mold 1 at the respective specified injection speed of $V_2$, $V_3$ and $V_4$ in each step.

EMBODIMENT 2

In the following description of Embodiment 2, the operation common with that in the Embodiment 1 is omitted.

In Embodiment 2, the screw positional value $S_1$ through $S_4$ at the injection start point, first and second injection speed selecting points and injection end point for the reference injecting condition are obtained in the same procedure as in Embodiment 1. The screw pushing pressure value $P_1$ and resin temperature $T_1$ with the screw at the injection start point for the reference injecting condition are also obtained in the same method as in Embodiment 1. Next, the screw positional value $S_1'$ at the injection start point for the changed injecting condition, and the screw pushing pressure value $P_1'$ for this screw position are obtained. The values of $S_1'$ and $P_1'$ are sent through the controller 13 to the processor 18.

The equation (3) is transformed through the equation (5) to the equation (5)' as follows:

$$\frac{S_0 + S_2}{V(P_2,T_1)} = \frac{S_0 + S_1}{V(P_1,T_1)} - \frac{G_1}{A} \qquad (5)$$

$$V(P_2,T_1) = (S_0 + S_2)\frac{1}{\left(\dfrac{S_0 + S_1}{V(P_1,T_1)} - \dfrac{G_1}{A}\right)} \qquad (5)'$$

By substituting the equation (5)' in the equation (4)' for the screw positional value $S_2$ at the first injection speed selecting point for the changed injecting condition, the following equation (6) is obtained.

$$S_2' = \frac{S_0 + S_2}{\left(\dfrac{S_0 + S_1}{V(P_1,T_1)} - \dfrac{G_1}{A}\right)} \cdot \left(\frac{S_0 + S_1'}{V(P_1',T_1)} - \frac{S_0 + S_1}{V(P_1,T_1)}\right) + S_2 \qquad (6)$$

The filling weight $G_1$ of the plasticized synthetic resin injected into the cavity 7 of the mold 1 while the screw 8 is moved from the injection start point to the first injection speed selecting point is obtained by interrupting the injection operation at the first injection speed selecting point (with the screw positional value of $S_2$) to form a molding by the short shot, and weighing the molding with an external weighing device. The obtained weight value $G_1$ is input to the processor 18 from the external input device 20.

The processor 18 then calculates the screw positional value $S_2'$ at the first injection speed selecting point for the changed injecting condition, using the equation (6). It also calculates the screw positional values $S_3'$ and $S_4'$ at the second injection speed selecting point and injection end point, respectively, through the same operations.

In both of the above Embodiments, the temperature of plasticized synthetic resin is detected for each injection process, and the specific volume value of the resin is obtained at each detected temperature. If fluctuation in the resin temperature is small, the resin temperature may be detected at intervals of a specified number of injection processes. In such a case, the resin temperature detected for certain injection process may be used until the next detection.

Now, the procedure for obtaining the PVT relation formula is described in the following. Of various PVT relation formulae proposed for plasticized synthetic resin, the Spencer & Gilmore's equation shown below is referred to for explanation.

$$(P+\pi')(V-\omega)=R'T \qquad (7)$$

wherein
P: resin pressure value of plasticized synthetic resin
V: specific volume value of plasticized synthetic resin
T: temperature of plasticized synthetic resin (absolute temperature)
$\pi'$, $\omega$, $R'$: constants peculiar to resin The equation (7) can be transformed to the following equation (7)':

$$V=R'T/(P+\pi')+\omega \qquad (7)'$$

Figure 6:
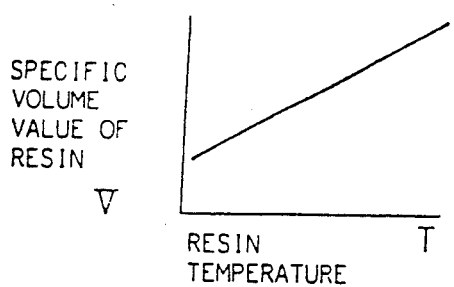

Therefore, under a constant pressure of plasticized synthetic resin, the specific volume value V of the plasticized synthetic resin is given in form of a linear function of the resin temperature T, as indicated in FIG. 6.

As described here, in actual molding operation with an injection molder, the specific volume value V of plasticized synthetic resin is the ratio of the volume V' of the resin injected from the cylinder to the weight G of the injected resin, as expressed by V=V'/G.

By varying the resin temperature T in specified multiple steps with the resin pressure value maintained constant at $P_o$, the value of the constant $\omega$ can be determined from the equation (7)'.

After the value of $\omega$ is determined, the resin pressure value P is varied in multiple steps with the resin temperature maintained constant at $T_o$. The varying resin pressure value is assumed to be $P_n$. When the specific volume value of plasticized synthetic resin at a constant pressure of $P_o$ is expressed as $V(P_o, T_o)$, and that of plasticized synthetic resin at a pressure of $P_n$ expressed as $V(P_n, T_o)$, the value of constant $\pi'$ can be determined from the following equation (8):

$$
\begin{aligned}
\{V(P_o, T_o) - \omega\}/\{V(P_n, T_o) - \omega\} &\quad (8)\\
&= \{R'T_o/(P_o + \pi')\}/\{R'T_o/(P_n + \pi')\}\\
&= (P_n + \pi')/(P_o + \pi')\\
&= (P_o + \pi' + \Delta P)/(P_o + \pi')\\
&= 1 + \Delta P/(P_o + \pi')\\
&\text{(in which } \Delta P = P_n - P_o\text{)}
\end{aligned}
$$

When the values of constants $\omega$ and $\pi'$ are determined, the value of constant R' can also be obtained from the equation (7). The PVT relation formula for the plasticized synthetic resin can thus be obtained from the Spencer & Gilmore's equation.

Figure 8:
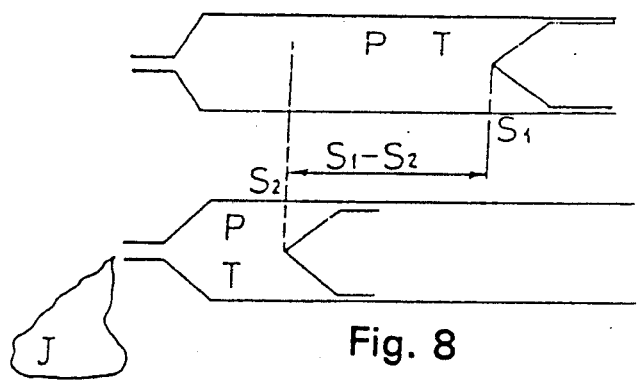
Figure 7:
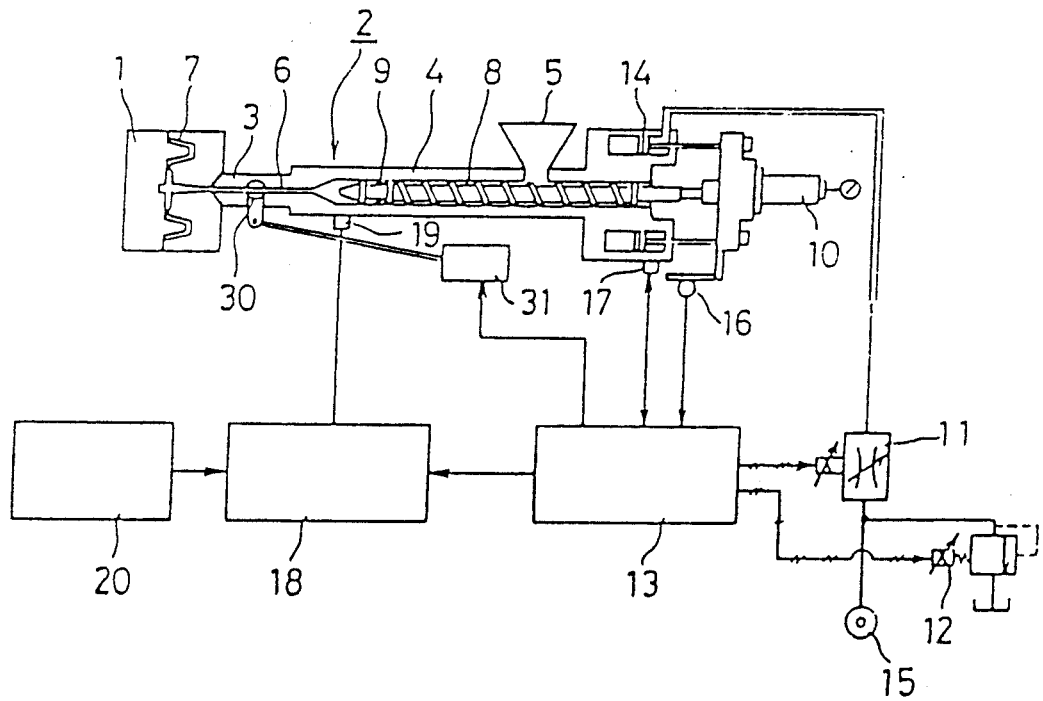

Now, the specific method of obtaining the PVT relation formula with an actual injection molder is explained with reference to FIGS. 7 and 8.

The PVT relation formula is obtained by using an injection molder having a flow path closing mechanism which is capable of blocking the flow of plasticized synthetic resin between the injection molder cylinder and a cavity of a mold. An example of such an injection molder 2 is shown in FIG. 7. A block valve 30 is provided in the flow path 6 of the nozzle 3 so as to prevent molten plasticized synthetic resin from flowing through the nozzle 3. The block valve 30 is operated by a driving unit 31 whose operation is controlled by the controller 13. In FIG. 7, the same parts denoted with the same reference numbers as in FIG. 2 provide the same functions. The explanation of such parts is therefore omitted.

Each of the following operation processes is performed with plasticized synthetic resin temperature at T.

i) First process

The block valve 30 is closed, and a specified pushing pressure P is applied by the injection piston 14 to the screw 8 with the block valve 30 in the closed state. Under this pushing pressure P, the screw 8 is moved forward to compress the plasticized synthetic resin in front of the screw 8, makes a balancing movement, and stops at a first stop position where the pushing pressure P equilibrates with the resilience of the compressed plasticized synthetic resin. The screw position detector 16 detects the positional value $S_1$ of the screw 8 at the first stop position, as a value corresponding to the volume of resin contained in the cylinder 4 in front of the screw 8 at the first stop position, and sends the detected value through the controller 13 to the processor 18.

ii) Second process

The block valve 30 is closed, and the screw 8 is moved forward. After an appropriate amount of plasticized synthetic resin is injected, the block valve 30 is closed. The weight of the injected resin is measured by a weighing device (not shown), and the measured weight J is input to the processor 18 from the external input device 20.

iii) Third process

The block valve 30 is closed again, and a specified pusing pressure P is applied by the injection piston 14 to the screw 8. Similar to the operation in the first process, the screw 8 makes a balancing movement and stops at a second stop position under the pushing pressure P. The screw position detector 16 detects the positional value $S_2$ of the screw 8 at the second stop position, as a value corresponding to the volume of resin contained in the cylinder 4 in front of the screw 8 at the second stop position, and sends the value to the processor 18.

The processor 18 performs operations to obtain the specific volume value V(P, T) of the plasticized synthetic resin at temperature T and pressure P, using the following equation (9):

$$
\begin{aligned}
V(P, T) &= V'/J \quad (9)\\
&= A \times (S_2 - S_1)/J
\end{aligned}
$$

wherein

V': volume of plasticized synthetic resin injected

A: inside cross sectional area of cylinder

By repeating a series of the above-mentioned detections and operations with either of the temperature T or pressure P of plasticized synthetic resin fixed and with the other varied in multiple steps, it is possible to obtain the values of the constants $\pi'$, $\omega$ and R' peculiar to the resin used in the equation (7), through operations. As a result, the PVT relation formula for the resin in question is obtained.

The PVT relation formula thus obtained is based on the Spencer & Gilmore's equation. The PVT relation formula can also be obtained in other methods such as an experimental analytical method (method of successive approximation with multiple variables).

POTENTIAL INDUSTRIAL APPLICATIONS OF THE INVENTION

In injection molding process in which injection speed is varied in multiple steps in each injection, the screw position and/or plasticized synthetic resin pressure immediately before injection can be changed from those of reference injecting condition. According to the present invention, appropriate injection speed selecting points are obtained through operations so that constant weight of plasticized synthetic resin is injected to fill in the cavity of a mold at each selected injection speed even under the changed injecting condition, and a series of injection steps under the changed injecting condition is controlled on the basis of the obtained injection speed selecting points. Consequently, it is possible to produce moldings with constant surface state and weight. Moreover, since the injection are calculated automatically, it is easy to change the injecting condition. Thus, the present invention will contributes to substantial increase in the production efficiency of continuous molding operation.

What is claimed is:

1. A method of controlling injection speed selecting points of an injection molder which injects plasticized synthetic resin from a cylinder into a cavity of a mold at a speed varied in multiple steps in each injection process, comprising the steps of:
   (a) preliminarily obtaining a formula for a relation among the resin pressure value, specific volume value and temperature of plasticized synthetic resin, as a characteristic equation for the plasticized synthetic resin;
   (b) detecting the resin pressure and screw positional values immediately before injection under a reference injecting condition, and the resin pressure value with the screw at each injection speed selecting point;
   (c) detecting the resin pressure and screw positional values immediately before injection under a changed injecting condition;
   (d) determining the injection speed selecting points for the changed injecting condition, through operations on the basis of the obtained formula for the relation among the resin pressure value, specific volume value and temperature of the resin as well as the detected resin pressure and screw positional values immediately before injection under the reference injecting condition and the detected resin pressure and screw positional values immediately before injection under the changed injecting condition; and
   (e) changing the injection speed when the screw has been moved from the position immediately before injection to each determined injection speed selecting point for the changed injecting condition.

2. The method of controlling the injection speed selecting points of an injection molder as described in the claim 1, in which said changed injecting condition refers to the condition in which the resin pressure value and/or screw positional value immediately before injection are changed from those of the reference injecting condition.

3. The method of controlling the injection speed selecting points of an injection molder as described in the claim 1, in which said resin pressure value is obtained by detecting the pushing pressure value applied to the screw to effect the resin pressure value.

4. The method of controlling the injection speed selecting points of an injection molder as described in claim 2, in which said resin pressure value is obtained by detecting the pushing pressure value applied to the screw to effect the resin pressure value.

5. A method of controlling injection speed selecting points of an injection molder which injects plasticized synthetic resin from a cylinder into a cavity of a mold at a speed varied in multiple steps in each injection process, comprising the steps of:
   (a) preliminarily obtaining a formula for a relation among the resin pressure value, specific volume value and temperature of plasticized synthetic resin, as a characteristic equation for the plasticized synthetic resin;
   (b) detecting the resin pressure and screw positional values immediately before injection under a reference injecting condition, and the weight of the plasticized resin injected into the cavity of the mold at each injection speed selecting point;
   (c) detecting the screw positional values immediately before injection under a changed injecting condition;
   (d) determining the injection speed selecting points for the changed injecting condition, through operations on the basis of the obtained formula for the relation among the resin pressure valve, specific volume value and temperature of the resin as well as the screw positional values immediately before injection under the reference injecting condition, the detected weight of the plasticized synthetic resin injected into the cavity of the mold by the screw moving from the position immediately before injection to each injection speed selecting point for the reference injecting, and the screw positional values immediately before injection under the changed injecting condition; and
   (e) changing the injection speed when the screw has been moved from the position immediately before injection to each determined injection speed selecting point for the changed injecting condition.

6. The method of controlling the injection speed selecting points of an injection molder as described in the claim 5, in which said changed injecting condition refers to the condition in which the weight of plasticized synthetic resin injected into the cavity of the mold and/or screw positional value immediately before injection are changed from those of the reference injecting condition.

* * * * *